(12) United States Patent
Colens

(10) Patent No.: US 7,787,989 B2
(45) Date of Patent: Aug. 31, 2010

(54) METHOD FOR CONTROLLING AN AUTONOMOUS MOBILE ROBOT AND RELATED DEVICE

(75) Inventor: André Colens, Rixensart (BE)

(73) Assignee: Husqvarna, Husqvarna (SE)

( * ) Notice: Subject to any disclaimer, the term of this patent is extended or adjusted under 35 U.S.C. 154(b) by 1219 days.

(21) Appl. No.: 10/503,041

(22) PCT Filed: Jan. 31, 2003

(86) PCT No.: PCT/BE03/00015

§ 371 (c)(1),
(2), (4) Date: Feb. 1, 2006

(87) PCT Pub. No.: WO03/065140

PCT Pub. Date: Aug. 7, 2003

(65) Prior Publication Data

US 2007/0027578 A1    Feb. 1, 2007

(30) Foreign Application Priority Data

Jan. 31, 2002    (BE) .................................. 2002/0054

(51) Int. Cl.
*G06F 19/00*    (2006.01)
(52) U.S. Cl. .................. 700/245; 700/253; 180/167; 180/168; 180/169; 318/568.11; 318/568.12; 318/580; 318/587; 342/22; 342/27; 342/70; 342/417; 701/22; 701/23
(58) Field of Classification Search ................ 700/245, 700/247, 257, 258, 259
See application file for complete search history.

(56) References Cited

U.S. PATENT DOCUMENTS

| | | | | | |
|---|---|---|---|---|---|
| 5,774,632 | A | * | 6/1998 | Kaske ........................ 706/25 |
| 5,940,346 | A | * | 8/1999 | Sadowsky et al. ........... 367/128 |
| 5,974,347 | A | * | 10/1999 | Nelson ........................ 701/22 |
| 6,122,323 | A | * | 9/2000 | Johnson ..................... 375/259 |
| 6,308,114 | B1 | * | 10/2001 | Kim .......................... 700/245 |
| 6,338,013 | B1 | * | 1/2002 | Ruffner ..................... 701/23 |
| 6,377,640 | B2 | * | 4/2002 | Trans ........................ 375/354 |
| 6,417,641 | B2 | * | 7/2002 | Peless et al. ................ 318/580 |
| 6,437,741 | B1 | * | 8/2002 | Fox ............................ 342/417 |
| 6,459,955 | B1 | * | 10/2002 | Bartsch et al. .............. 700/245 |
| 6,466,011 | B1 | * | 10/2002 | Imanaka et al. ........ 324/207.23 |
| 6,615,108 | B1 | * | 9/2003 | Peless et al. ................ 700/245 |
| 6,748,297 | B2 | * | 6/2004 | Song et al. .................. 700/259 |

(Continued)

*Primary Examiner*—Khoi Tran
*Assistant Examiner*—Jonathan Sample

(57) ABSTRACT

The invention concerns a navigation device for a mobile robot comprising means for measuring the amplitude and the phase of an electromagnetic signal emitted by a wire acting as limit for a working area of the robot. The measuring means samples the amplitude of the signal during each time interval, the result of each measurement is stored in a memory and the measurements are repeated for several time intervals, the collected results being added in said memories until the content of a memory reaches a reference threshold. The number of samples required and the content of each memory is interpreted by numerical analysis to determine the distance or distance variation relative to said limiting elements. Any phase change corresponding to a passage beyond the limiting wire is easily detected and results for example in a command returning the robot to its working area.

15 Claims, 3 Drawing Sheets

U.S. PATENT DOCUMENTS

| | | | |
|---|---|---|---|
| 2003/0039171 A1* | 2/2003 | Chiapetta | 367/98 |
| 2003/0151541 A1* | 8/2003 | Oswald et al. | 342/70 |
| 2004/0015266 A1* | 1/2004 | Skoog | 700/245 |
| 2004/0093650 A1* | 5/2004 | Martins et al. | 901/1 |
| 2004/0111184 A1* | 6/2004 | Chiappetta et al. | 700/245 |
| 2007/0027578 A1* | 2/2007 | Colens | 700/245 |

* cited by examiner

METHOD FOR CONTROLLING AN AUTONOMOUS MOBILE ROBOT AND RELATED DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a method for controlling an autonomous mobile robot.

2. Description of Related Art

In order to limit their displacement, the majority of autonomous mobile units, such as automatic lawn mowers, use an electronic barrier made up of a wire positioned on the periphery of the surface to be covered and in which a low frequency electric signal circulates (for example a few tens of mA at 5 KHz).

The utility of the exact measuring of the signal amplitude within the scope of a navigation system for automatic lawn mowers has already been described in patent application PCT/BE98/00038 (U.S. Pat. No. 6,321,515).

BRIEF SUMMARY OF THE INVENTION

The exact knowledge of the amplitude and the phase of the signal allows the robots to be kept located in the interior of the perimeter of the peripheral wire. The measuring of the signal phase allows the determination of whether the measurement is made on the interior or exterior of the loop generating the magnetic field. By passing through the interior of the loop on the exterior, the lines of force change direction and generate a signal phase change of 180° according to the general laws of electromagnetism.

The object of this invention is to provide an effective and inexpensive measuring device that simultaneously allows the exact measuring of the signal amplitude with a constant signal to noise ratio regardless of the position of the mobile unit on the surface as well as the generation of the phase data that allows the mobile unit to determine with certainty if it is on the interior or exterior of the surface to be covered.

BRIEF DESCRIPTION OF THE SEVERAL VIEWS OF THE DRAWINGS

The figures provided in the annexes illustrate the invention only in a exemplary way.

DETAILED DESCRIPTION OF THE INVENTION

Figure 1:
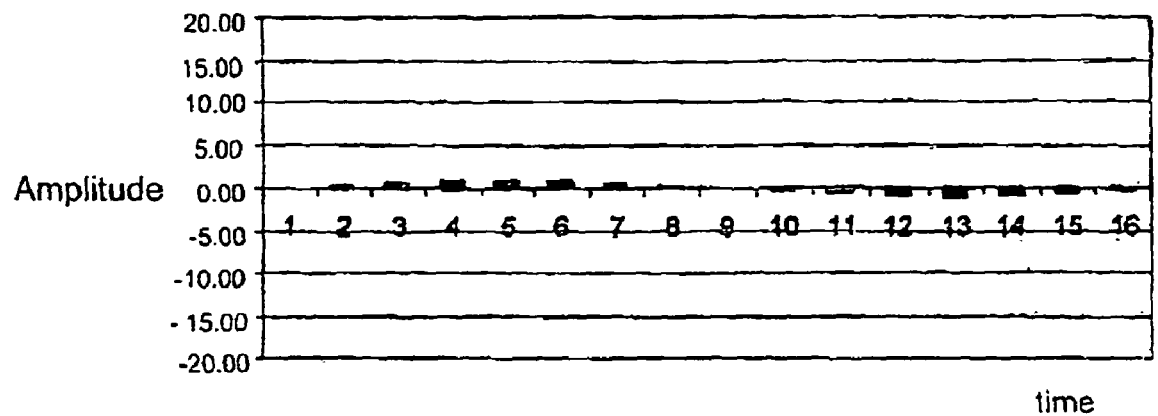
FIGS. 1 to 3 show the variation of the content of the baskets after 2, 10, and 36 periods, respectively.

One of the features of the device and method according to the invention consists in the use of a filter for measuring the amplitude, which is a particular variant of a filter adapted to the detection of periodical signals, already used for example in astronomy for the detection of distant stars, called a "multichannel scaler" or "averager". This type of filter is described in the literature for example in "The art of electronics", P. Horowitz, Cambridge University Press 2d Ed. Chap. 15 par. 13 and following.

This type of device carries out several synchronic samplings of the signal amplitude during each period. Each sample is stored in an independent memory (baskets). The measurements are repeated during several periods and the corresponding samples are added in each basket.

In other words, the form of the signal is co-added modulo its period.

The advantage of applying this type of device to a robotic mobile unit is that it allows the simple extraction of the phase and the amplitude of the periodic signal originating from the peripheral wire from the large amount of electrical noise generated by the mobile unit.

At the end of each period, the content of the basket is compared with a fixed reference. If the contents of any basket do not exceed the reference value, a counter is increased. After a certain number of repetitions the counter of one of the baskets unavoidably exceeds the referred value. The value of the counter is stored and the counter is reset to zero.

The stored value C of the counter, possibly associated to a calibration operation, allows the determination of the distance of the machine in relation to the peripheral wire. The farther the machine is from the wire, the weaker the signal, and the greater the number of samples necessary to reach the reference value.

The distance may be determined for example by applying the relation $C=K*X((D-X)/D)$ where two parallel wires are assumed, X is the distance of the mobile unit from the wire, D is the distance between the wires and k is a constant which takes account of the gain of the device.

As can be understood, one of the advantages of this device is that the signal to noise ratio of the measurement remains constant regardless of the signal value, that is to say whatever the distance of the machine relative to the wire is, the selectivity factor of the filter being proportional to the number of samples and the latter being inversely proportional to the signal amplitude.

The totality of the baskets also provides a representation of the shape of the signal. The greater the number of samples per period the more precise the signal shape will be.

The numerical analysis of the waveform by the onboard computer allows the easy detection of a signal phase change, particularly if the latter is asymmetrical.

In the case of a symmetrical signal, a phase reference must be conserved by the onboard computer. This can be obtained either by using a stable local oscillator whose phase follows the peripheral signal phase by means of a PLL, the feedback loop being opened if the mobile unit leaves the enclosure, or by using a second coil positioned on one side of the mobile unit. In the latter case, when the machine crosses the limit, one of the coils is located outside and the other one inside the limit defined by the peripheral wire. The phase difference is detected immediately and the machine will come back entirely within the working surface.

It should be noted that independently of the detection of the 180° phase change caused by passing over the peripheral wire, the system is also capable of detecting a phase modulation generated by the peripheral wire generator, and therefore is also capable of receiving a message sent by the peripheral wire to the machine. This message may be a parameterisation. message or a control message, for example for instructing the return of the robot to the recharging station.

In summary the invention provides thus among others a navigational device for mobile robot comprising a microprocessor and a means for measuring the amplitude of a periodic electromagnetic signal of low frequency produced by one or several limiting elements, for example a wire, located at the periphery of the working surface of said mobile robot, the measuring means effecting a sampling of the amplitude of the signal during each period, the result of each sample measurement being stored in a independent memory and the measurements being repeated during several periods, the collected results being added in said memories until the contents of one memory reaches a reference value, the number of necessary samples and the content of each memory allowing the interpretation by numerical analysis performed by the microprocessor in order to determine the distance or variation of the distance relative to said limiting elements.

The figures provided in the annexes illustrate the invention only in a exemplary way.

Figure 2:
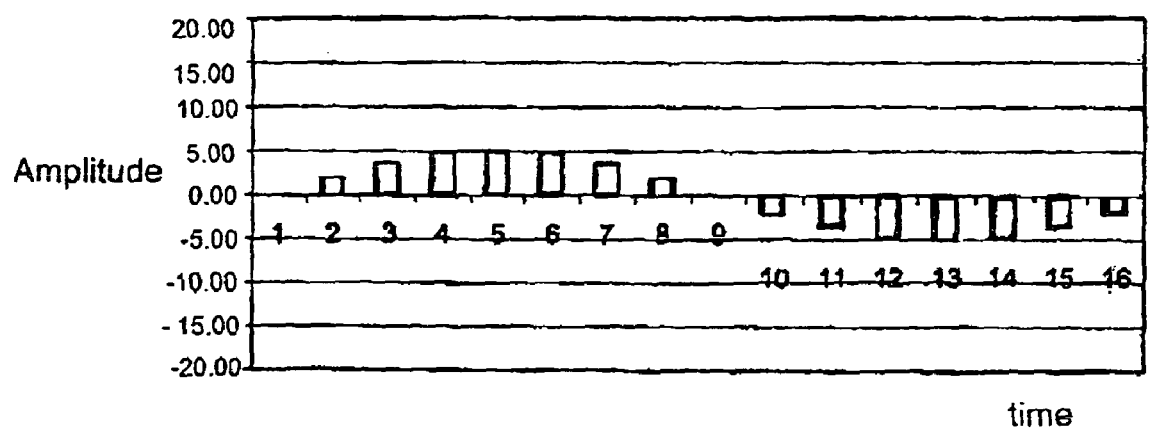
Figure 3:
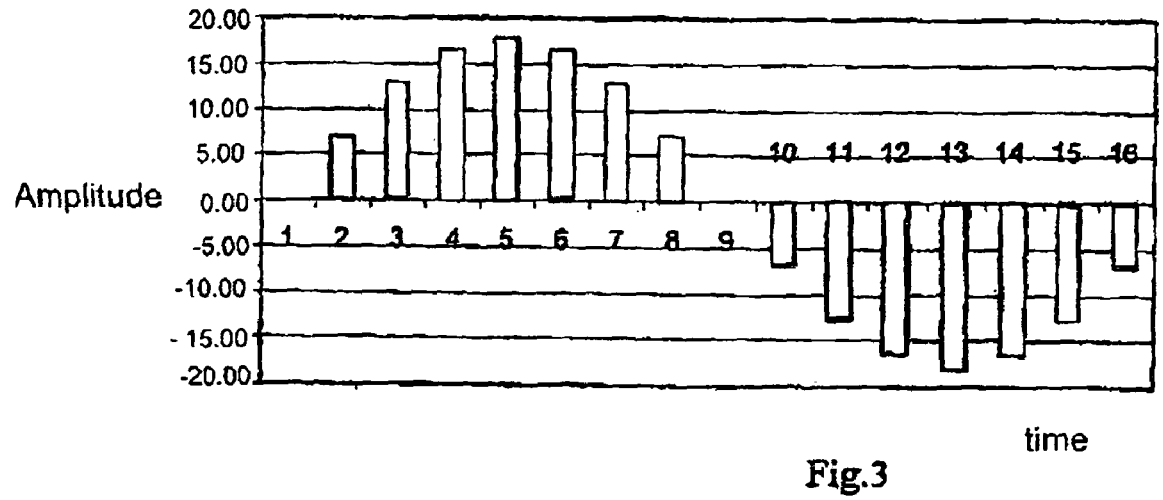

FIGS. 1 to 3 show the variation of the content of the baskets after 2, 10, and 36 periods, respectively. At the 36th period the content of the basket no 5 exceeds the fixed value of 18 units (reference value).

This number of periods, possibly as well as the accurate value of the contents of the basket no 5, are stored and used by the onboard computer to determine the distance to the peripheral wire. This determination may be relative or absolute. A relative determination is enough if the robotic machine, according to its internal navigational algorithm, must simply follow a path parallel to the peripheral wire.

Figure 4:
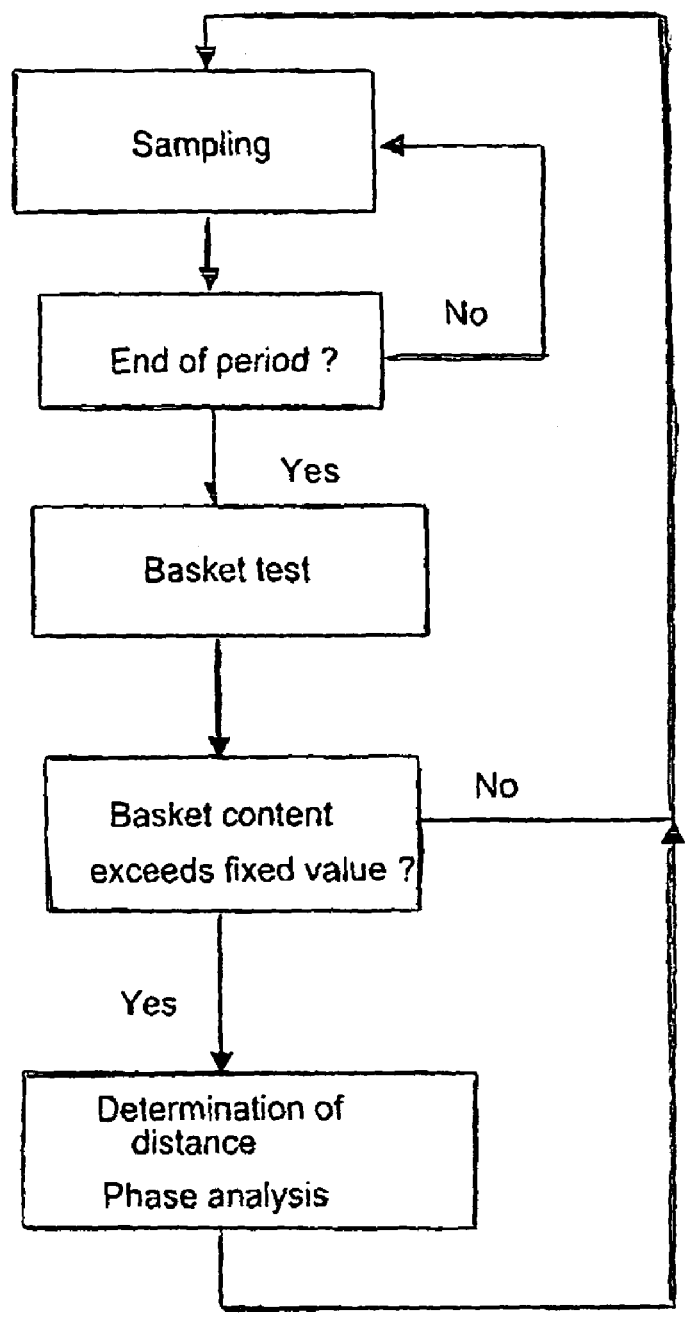
FIG. 4 shows a block diagram explaining the different phases of the measuring loop.

FIG. 4 shows a block diagram explaining the different phases of the measuring loop.

Figure 5:
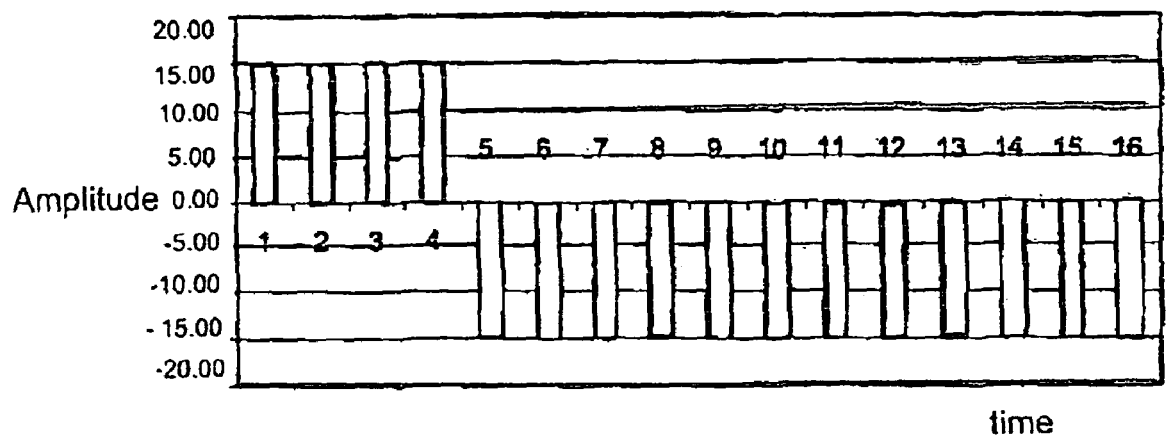
FIGS. 5 and 6 illustrate the contents of the baskets for a square asymmetrical signal, the machine being on the interior and exterior of the peripheral wire, respectively.
Figure 6:
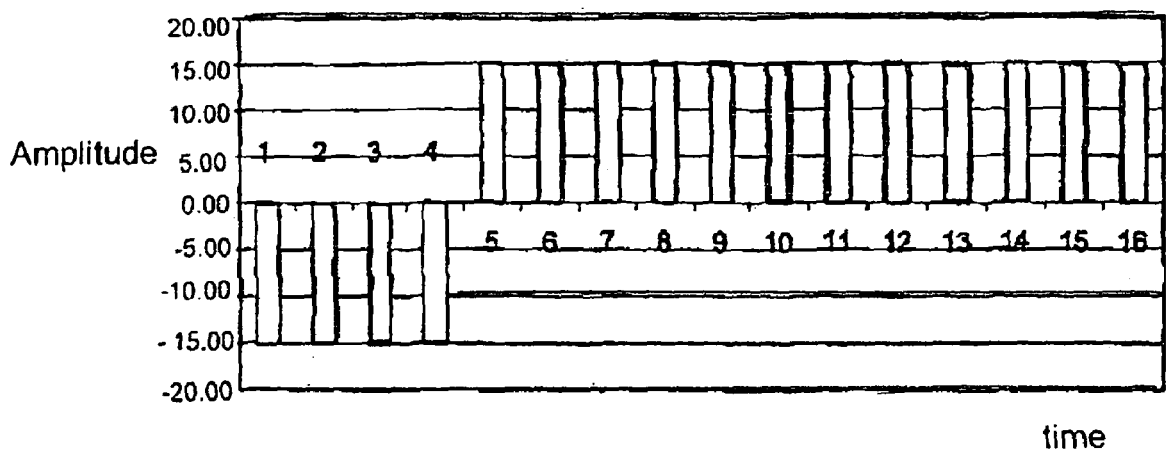

FIGS. 5 and 6 illustrate the contents of the baskets for a square asymmetrical signal, the machine being on the interior and exterior of the peripheral wire, respectively.

If the content of the baskets for two out-of-phase asymmetric signals of 180° are considered, it is easy to see that in the case of the signal in FIG. 5 there are 4 positive baskets and that in the case of the signal in FIG. 6 there are 12 of them.

The invention may be applied or adapted to machines other than lawn mowers, for example machines for picking up objects or for robotic vacuum cleaners.

The invention claimed is:

1. A navigational device for a mobile robot, comprising:
a plurality of independent memories;
at least one limiting element positioned at a periphery of a work surface of said mobile robot;
a means for measuring the amplitude of a periodic electromagnetic signal of low frequency transmitted by said at least one limiting element, said measuring means carrying out at least two samples of the signal amplitude during a single period;
a means for adding a first one of said at least two samples to a content of a first one of said plurality of independent memories and for adding a second one of said at least two samples to a content of a second one of said plurality of independent memories, said content of said second one of said plurality of independent memories independent from said content of said first one of said plurality of independent memories, said at least two samples being measured repeatedly over several periods and for each period during which said at least two samples are measured said at least two samples being added to said respective ones of said plurality of independent memories reaches a reference threshold;
wherein said at least two samples are synchronic samples of said periodic electromagnetic signal amplitude measured repeatedly over several periods;
a means for interpreting by numerical analysis the number of samples necessary and the content of each of said plurality of independent memories to determine a distance of said robot in relation to said at least one limiting element.

2. The navigation device according to claim 1 further comprising a means for measuring the phase of said periodic electromagnetic signal.

3. The navigation device according to claim 2 wherein the numerical analysis interpreting means also detects the shape of the signal and is able to determine a phase change caused by the passing of the robot beyond said at least one limiting element.

4. The navigation device according to claim 1 further comprising a peripheral wire generator which produces said periodic electromagnetic signal of low frequency, wherein the numerical analysis interpreting means is also capable of detecting a phase modulation generated by the peripheral wire generator, and therefore of receiving a message sent by the peripheral wire to the mobile robot.

5. The navigation device according to claim 4 wherein the message is an instruction to the robot to return to a recharging station.

6. The navigation device according to claim 1 wherein a phase reference is conserved.

7. The navigation device according to claim 1 adapted to a robotic lawn mower.

8. The navigation device according to claim 1 wherein said amplitude measuring means further comprises two detectors of the amplitude of the periodic signal placed at two different locations of the mobile machine.

9. A method of controlling a mobile robotic machine, comprising the steps of:
measuring an amplitude and a phase of a periodic electromagnetic signal of low frequency transmitted by at least one limit element located at the periphery of a working surface of said mobile robot, said measuring means effecting at least two samples of the amplitude of the signal during each period;
storing the result of said at least two samples separately and distinctly in at least two memories;
repeating said measuring and storing steps during several periods, said at least two samples being added in said at least two memories until the content of one memory reaches a reference value, the number of necessary samples and the content of each memory allowing the interpretation by numeric analysis performed by the microprocessor, wherein said interpretation by numeric analysis further comprises determining a shape of said periodic signal.

10. A method according to claim 9 wherein an instruction of return is transmitted to the robotic machine when a phase change is detected.

11. The method of claim 9 wherein said interpretation by numeric analysis further comprises determining a distance between said mobile robotic machine and said at least one limiting element.

12. The method of claim 9 wherein said interpretation by numeric analysis further comprises determining a variation of distance between said mobile robotic machine and said at least one limiting element.

13. The navigation device according to claim 1 wherein said one or more limiting elements further comprise a wire.

14. The navigation device according to claim 1 wherein said distance comprises a distance variation of said robot relative to said at least one limiting element.

15. The navigation device according to claim 1 wherein said means for interpreting by numerical analysis further comprises a microprocessor.

* * * * *